(12) United States Patent
Bank et al.

(10) Patent No.: US 6,827,341 B2
(45) Date of Patent: Dec. 7, 2004

(54) SPRING SYSTEM

(75) Inventors: Christoph Bank, Lehrte (DE);
Gerhard Thurow, Garbsen (DE); Paul Cerny, Wennigsen (DE); Helmut Luncz, Korntal (DE); Andreas Zeltlitz, Pfaffenhofen (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 0 days.

(21) Appl. No.: 10/449,674

(22) Filed: Jun. 2, 2003

(65) Prior Publication Data

US 2004/0012131 A1 Jan. 22, 2004

(30) Foreign Application Priority Data

Jun. 1, 2002 (DE) .......................................... 102 24 442

(51) Int. Cl.$^7$ ................................................. F16F 9/04
(52) U.S. Cl. ............................... 267/64.21; 267/64.19; 267/64.23; 267/64.24; 188/322.12
(58) Field of Search .......................... 267/64.24, 64.19, 267/64.21, 64.27, 64.23, 122, 35; 188/322.12, 298

(56) References Cited

U.S. PATENT DOCUMENTS

| | | | | |
|---|---|---|---|---|
| 5,366,048 A | * | 11/1994 | Watanabe et al. ......... | 188/267.1 |
| 5,501,432 A | * | 3/1996 | Tattermusch et al. ..... | 267/64.24 |
| 5,996,980 A | * | 12/1999 | Frey et al. ................ | 267/64.27 |
| 6,054,194 A | * | 4/2000 | Kane ........................... | 428/12 |
| 6,375,170 B1 | * | 4/2002 | Thurow et al. ............. | 267/122 |

FOREIGN PATENT DOCUMENTS

| | | | |
|---|---|---|---|
| DE | 19913754 A1 | * | 9/2000 |
| DE | 10024571 A1 | * | 11/2001 |
| DE | 10024572 A1 | * | 11/2001 |

* cited by examiner

Primary Examiner—Matthew C. Graham
Assistant Examiner—Mariano Sy
(74) Attorney, Agent, or Firm—Walter Ottesen

(57) ABSTRACT

The invention relates to a spring system (2) having two spring units (4a, 4b) arranged coaxially with respect to each other. Each spring unit essentially includes a flexible member (6a, 6b) and a roll-off piston (8a, 8b). The two flexible members (6a, 6b), the roll-off pistons (8a, 8b) and a common outer jacket (10) enclose a common pressure space (14) filled with compressible gas or with a hydraulic liquid. A contamination flexible member (16) is mounted between the roll-off piston (8) and the outer jacket (10) in order to prevent a contamination of the flexible member roll-off surfaces. The contamination flexible member (16) is clamped, on the one hand, in the region of the roll-off piston (8) and, on the other hand, on the outer jacket (10). The effective length of the contamination flexible member (16) is somewhat less than the effective length of the shorter of the two work flexible members (6a, 6b). In this way, the contamination flexible member (16) functions additionally as an end stop (pull stop).

9 Claims, 2 Drawing Sheets

SPRING SYSTEM

BACKGROUND OF THE INVENTION

U.S. Pat. No. 6,375,170 discloses a spring system having first and second spring units mounted in mirror image to each other. Each of the two spring units comprises essentially a flexible member and a roll-off piston. An outer jacket common to both spring units is provided for lateral limiting and as a counter support to the two roll-off pistons. The flexible members likewise roll off on the outer jacket. The two flexible members can form a single piece. The roll-off pistons are slightly conically configured at the ends and the outer jacket is configured conically at both ends. The annular gap between the roll-off pistons and the outer jacket is open so that there is no protection against dust. For this reason, the problem of the sensitive flexible member roll-off surfaces being subjected to dirt and contaminants is present. The reliability is no longer ensured when the flexible member becomes dirty. Accordingly, the expected service life is drastically reduced.

German patent publication 100 24 572 discloses a combined spring damper system having a double flexible member. This system includes two roll-off pistons mounted axially opposite to each other and on which corresponding tubular-shaped flexible members can roll off. Each of the tubular-shaped flexible members is connected, on the one hand, to a roll-off piston and, on the other hand, to each other via a connecting sleeve.

German patent publication 199 13 754 discloses a spring element for an air spring system. The spring element is configured of an inner tube-shaped first flexible member and an outer second flexible member which is essentially the same geometrically as the first flexible member. The first flexible member is made of weaker material and this material is more readily deformable. The second flexible member functions as the outer guide for the first flexible member.

SUMMARY OF THE INVENTION

It is an object of the invention to provide a spring system which provides a longer service life with simple constructive means.

The spring system of the invention includes: first and second spring units mounted coaxially to each other; the first spring unit including a first roll-off piston and a first rolling-lobe flexible member coacting with the first roll-off piston during operation of the spring system; the second spring unit including a second roll-off piston and a second rolling-lobe flexible member coacting with the second roll-off piston during operation of the spring system; the first and second roll-off pistons being rigidly connected to each other to define a double roll-off piston; an outer jacket common to both of the first and second spring units; the first and second rolling-lobe flexible members and the double roll-off piston conjointly defining a common pressure space filled with a fluid; a contamination flexible member connected between the double roll-off piston and the outer jacket; and, the contamination flexible member having an effective length shorter than the shorter of the first and second rolling-lobe flexible members so that the contamination flexible member functions as a stop during the operation of the spring system.

With the invention, a contamination of the inner-lying components and especially a contamination of the flexible member roll-off surfaces is prevented. This is achieved with a contamination flexible member arranged in accordance with the invention between one of the roll-off pistons and the outer jacket.

The contamination flexible member is clamped, on the one hand, in the region of a roll-off piston and, on the other hand, on the outer jacket. The effective length of this contamination flexible member is somewhat less than the effective length of the shorter of the two working flexible members. In this way, the contamination flexible member functions also as an end stop (pull stop). The fact that there is a slightly shorter maximum stroke (spring path) is of no consequence.

With the use of clamp rings and adapters coacting with the clamp rings, an air-tight contact engagement of the flexible member on the roll-off piston and on the outer jacket is achieved. The air-tight contact engagement effectively prevents a relative slippage when applying a pull or push force on the flexible member.

With a targeted arrangement of a reinforcement layer arranged within the contamination flexible member, the pull stop characteristic line can be influenced. The reinforcement layer comprising reinforcement cords can, for example, be arranged in the fabric or material of the contamination flexible member, for example, in a range of 0° to 90° to the axial direction. The contamination flexible member functions as an end stop and takes up static forces (for example, those forces which occur with jacking up of the vehicle) as well as dynamic forces during excessive spring deflection. In this way, the flexible member combines the characteristics of two components in one in an advantageous manner, namely: end stop and a protection against contamination.

To prevent the situation that the contamination flexible member becomes creased or crushed during spring compression, this flexible member is so configured that it rolls off by itself under atmospheric pressure. A slight inner overpressure is provided to support the roll-off operation as needed. For this purpose, the contamination flexible member can be provided with a pressure-limiting valve or an overpressure flap.

The flexible member according to the invention is especially provided for the use in motor vehicle air springs or hydraulic springs (medium is air or oil). Other applications are in uses for driver seat air springs, driver cabin air springs and industrial support air springs.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
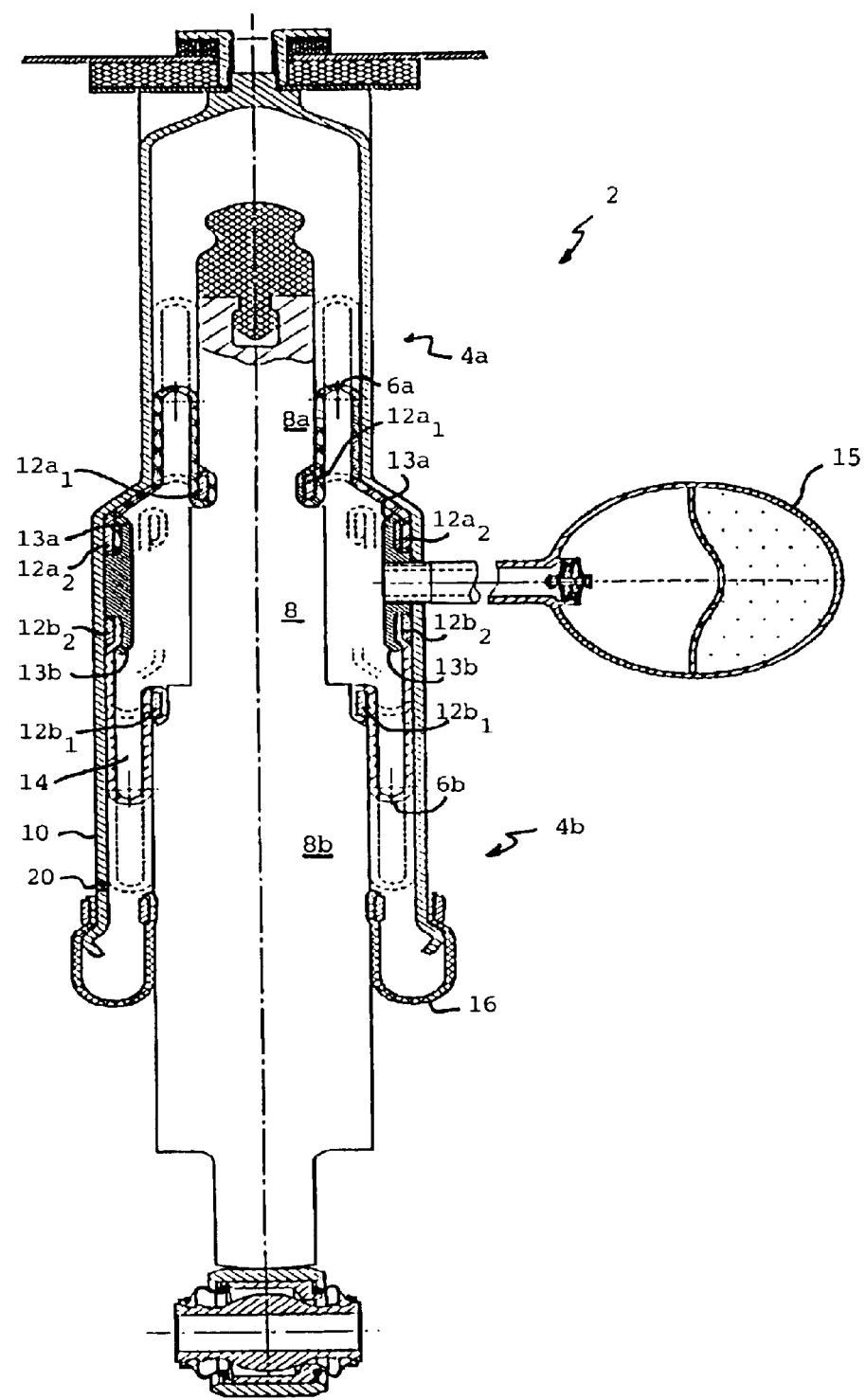
FIG. 1 is a side elevation view, in section, of a spring system according to the invention; and, FIG. 2 is a side elevation view, in section, of the same air spring system in the expanded spring state at an end stop.

The spring system 2 shown in FIG. 1 is made up of two spring units (4a, 4b). Each of these spring units (4a, 4b) comprises essentially a flexible member (6a, 6b) and a roll-off piston (8a, 8b). The usual cover plate which is needed for conventional air springs can be omitted because a common outer jacket 10 is provided for providing lateral support to the flexible members.

In the embodiment shown, the two roll-off pistons (8a, 8b) are rigidly connected to each other and conjointly define a common double roll-off piston 8. The two flexible members (6a, 6b) can define a common double flexible member. The ends of the flexible members (6a, 6b) are, on the one hand, connected to roll-off pistons (8a, 8b) via respective clamp rings ($12a_1$, $12b_1$) and are, on the other hand, connected pressure tight to the outer jacket 10 by means of adapters (13a, 13b) in addition to respective clamp rings ($12a_2$, $12b_2$) The interior space (pressure space) 14 of the spring system 2 can be filled with gas or a hydraulic fluid. A pressure store 15 is required in the case of a filling with hydraulic fluid. The outer surfaces of the roll-off piston 8 and the inner surfaces of the outer jacket 10 of the two spring units (4a, 4b) are configured so as to be asymmetrical with respect to each other. This can be provided in that the double roll-off piston 8 and/or the common outer jacket 10 is (are) configured to be conical or, as shown here, the surface of the double roll-off piston 8 and the inner surface of the jacket 10 are so configured that the two double flexible member halves (6a, 6b) have different effective radii with respect to each other. The double flexible member halves (6a, 6b) roll off between the piston 8 and the jacket 10.

If the double piston 8, which is attached at the wheel end, is moved axially relative to the jacket 10 fixed at the chassis end, then the two flexible members (6a, 6b), which are disposed between the piston 8 and the jacket 10, roll off, on the one hand, on the outer surface of the piston 8 and, on the other hand, roll off on the inner surface of the jacket 10. The two radii of curvature which result when charging the flexible members (6a, 6b) with pressurized air or hydraulic fluid, are proportional to the difference of the effective flexible member radii of curvature.

According to the invention, a contamination flexible member 16 is introduced between the roll-off piston 8 and the lower end of the outer jacket 10. With the contamination flexible member 16, the annular gap, which is disposed between the roll-off piston 8 and the outer jacket 10, is reliably covered. The contamination flexible member 16 is so wide that it rolls off on the outer surface of the piston 8 without pressure during a spring compression operation.

Figure 2:
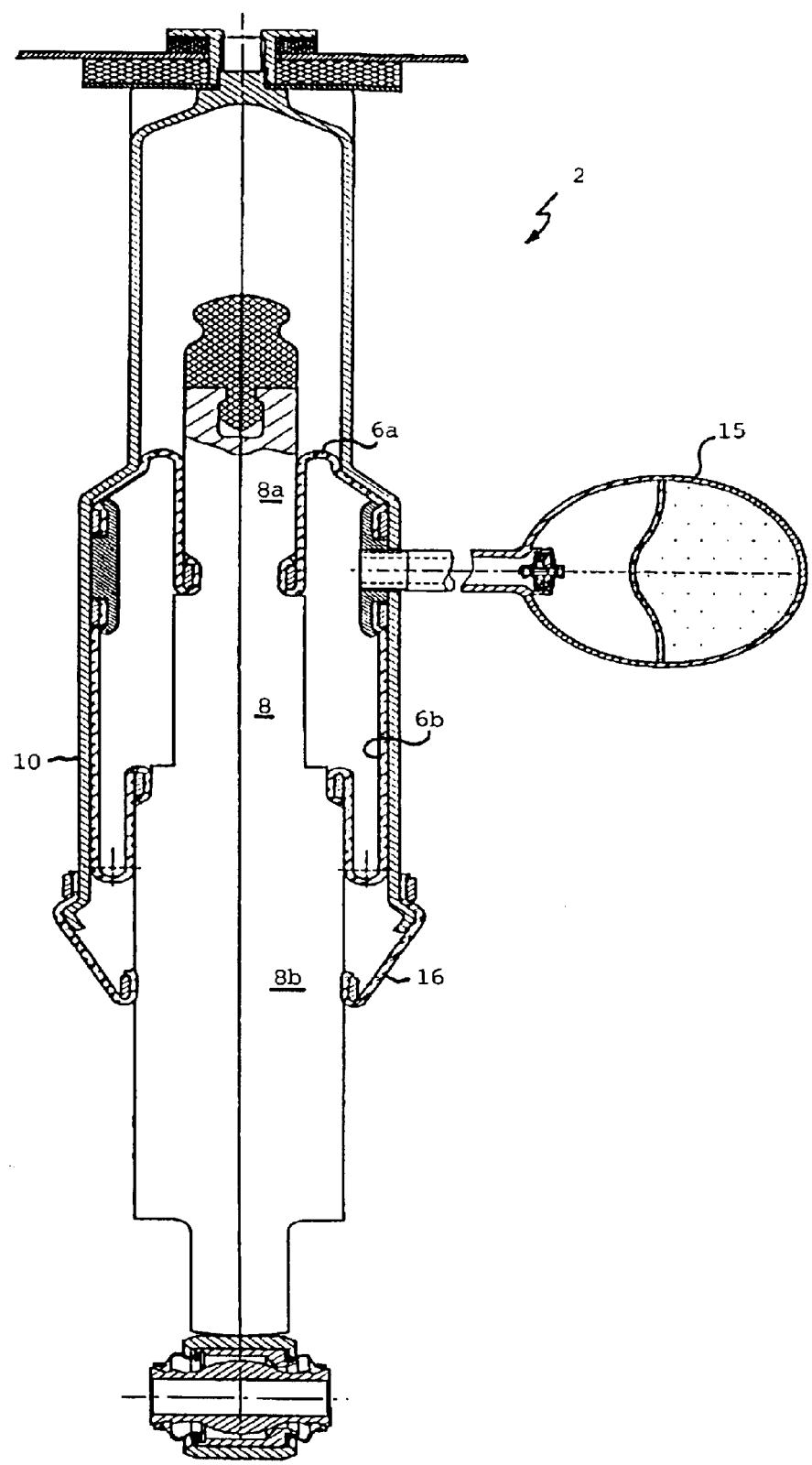

In the embodiment shown, the rolling lobe of the contamination flexible member 16 is shorter than each of the rolling lobes of the working flexible members (6a, 6b). In this way, the contamination flexible member 16 functions as an end stop (see FIG. 2). Pressure means 20 in the form of a pressure limiting valve or an over pressure flap can be mounted, for example, in the outer jacket 10 to support the roll-off operation of the contamination flexible member. In this way a slight overpressure can be provided in the interior space closed off by the contamination flexible member 16 and the outer jacket 10.

It is understood that the foregoing description is that of the preferred embodiments of the invention and that various changes and modifications may be made thereto without departing from the spirit and scope of the invention as defined in the appended claims.

What is claimed is:

1. A spring system comprising:
    first and second spring units mounted coaxially to each other;
    said first spring unit including a first roll-off piston and a first rolling-lobe flexible member coacting with said first roll-off piston during operation of said spring system to form a first rolling lobe;
    said second spring unit including a second roll off piston and a second rolling-lobe flexible member coacting with said second roll-off piston during operation of said spring system to form a second rolling lobe;
    said first and second roll-off pistons being rigidly connected to each other to define a double roll-off piston;
    an outer jacket common to both of said first and second spring units;
    said outer jacket and at least one of said spring units defining an interior space;
    said first and second rolling-lobe flexible members and said double roll-off piston conjointly defining a common pressure space filled with a fluid;
    a contamination flexible member connected between said double roll-off piston and said outer jacket to shield said interior space from contaminants and to form a third rolling lobe rolling off on said double roll-off piston during operation of said spring system; and,
    said third rolling lobe at said contamination flexible member being shorter than each one of said first and second rolling lobes of said first and second rolling-lobe flexible members so as to cause said contamination flexible member to function as a stop during the operation of said spring system.

2. The spring system of claim 1, said roll-off piston and said outer jacket defining roll off surfaces on which said rolling-lobe flexible members roll off during operation of said spring system; and, said contamination flexible member being configured and mounted between said double roll-off piston and said outer jacket to prevent contaminants from the ambient from reaching said roll-off surfaces whereby an increased service life for said spring system is obtained.

3. The spring system of claim 1, wherein said first and second rolling-lobe flexible members each have first and second ends; and, said spring system further comprises first and second sets of clamp rings; a first one of the clamp rings of said first set clamping said first end of said first rolling-lobe flexible member to said first roll-off piston and a second one of the clamp rings of said first set clamping said second end of said first rolling-lobe flexible member to said outer jacket; and, a first one of the clamp rings of said second set of clamp rings clamping said first end of said second rolling-lobe flexible member to said second roll-off piston and the second one of the clamp rings of said second set of clamp rings clamping said second end of said second rolling-lobe flexible member to said outer jacket.

4. The spring system of claim 3, further comprising an adapter for coacting with the second clamp ring of each of said sets of clamp rings to secure the corresponding ones of said second ends of said first and second rolling-lobe flexible members to said outer jacket.

5. The spring system of claim 1, wherein said first and second flexible members conjointly define a double flexible member.

6. The spring system of claim 1, wherein said contamination flexible member includes a reinforcement layer having an orientation in an axial direction or in range of up to 90° to said axial direction whereby a pull stop characteristic line can be influenced.

7. The spring system of claim 1, further comprising pressure means for providing a slight overpressure in a region enclosed by said contamination flexible member and said outer jacket so as to prevent said contamination flexible member from becoming creased or crushed during operation of said spring system.

8. The spring system of claim 1, wherein said fluid filling said pressure space is a hydraulic incompressible liquid.

9. The spring system of claim 1, wherein said fluid is a compressible gas.

* * * * *

UNITED STATES PATENT AND TRADEMARK OFFICE
CERTIFICATE OF CORRECTION

PATENT NO. : 6,827,341 B2
DATED : December 7, 2004
INVENTOR(S) : Christoph Bank et al.

It is certified that error appears in the above-identified patent and that said Letters Patent is hereby corrected as shown below:

Column 3,
Line 4, delete "($12a_2$, $12b_2$)" and substitute -- ($12a_2$, $12b_2$). -- therefor.

Column 4,
Line 14, delete "at" and substitute -- of -- therefor.
Line 52, -- a -- should be inserted before "range".

Signed and Sealed this

Twenty-second Day of February, 2005

JON W. DUDAS
*Director of the United States Patent and Trademark Office*